US007534316B2

(12) United States Patent
Ripplinger et al.

(10) Patent No.: US 7,534,316 B2
(45) Date of Patent: May 19, 2009

(54) CROSS-GRADE SPIN WELDING APPARATUS AND METHOD

(76) Inventors: Jacob F. Ripplinger, 931 W. 2880 South, Nibley, UT (US) 84321; C. Robert Ripplinger, 66 E. 100 North, Millville, UT (US) 84326

( * ) Notice: Subject to any disclaimer, the term of this patent is extended or adjusted under 35 U.S.C. 154(b) by 417 days.

(21) Appl. No.: 11/154,936

(22) Filed: Jun. 16, 2005

(65) Prior Publication Data
US 2005/0284559 A1 Dec. 29, 2005

Related U.S. Application Data

(60) Provisional application No. 60/580,567, filed on Jun. 17, 2004.

(51) Int. Cl.
*B32B 37/00* (2006.01)
(52) U.S. Cl. ...................... 156/73.5; 156/293
(58) Field of Classification Search .............. 156/73.5, 156/73.6, 293, 294, 308.2; 264/68, 69
See application file for complete search history.

(56) References Cited

U.S. PATENT DOCUMENTS

| | | | |
|---|---|---|---|
| 4,511,417 A | * | 4/1985 | Yealy ........................ 156/73.5 |
| 4,514,242 A | * | 4/1985 | MacLaughlin et al. ..... 156/73.5 |
| 5,464,171 A | | 11/1995 | Ripplinger |
| 6,003,807 A | | 12/1999 | Ripplinger |
| 6,102,327 A | | 8/2000 | Ripplinger |
| 6,598,825 B2 | | 7/2003 | Ripplinger |

OTHER PUBLICATIONS

Rotheiser, Jordon, "Joining of Plastic: Handbook for Designers and Engineers," Hanser Publishers, Cincinnati, Ohio, 1999, pp. 413-425.

* cited by examiner

*Primary Examiner*—James Sells
(74) *Attorney, Agent, or Firm*—Pate Pierce & Baird

(57) ABSTRACT

A method for welding parts formed of polymeric resins having different melt-index grades. The method may include the steps of selecting a tube formed of a first thermoplastic in an extrusion process, selecting a first flange formed of a second thermoplastic in an injection molding process and having a containment region sized to receive an end of the tube, inserting an end of the tube within the containment region of the first flange, and welding the tube to the flange by inducing relative rotation between the flange and the tube. The containment region may have a depth more than two times the wall thickness of the tube. Moreover, the containment region may maintain its shape and support friction pressure on a significant portion of melted material within the weld zone, so the material may continue to generate heat and conduct the same to the less easily melted material.

25 Claims, 13 Drawing Sheets

SECTION A-A

SECTION B-B  FIG. 3

CROSS-GRADE SPIN WELDING APPARATUS AND METHOD

RELATED APPLICATIONS

This application claims the benefit of U.S. Provisional Patent Application Ser. No. 60/580,567, filed Jun. 17, 2004 for CROSS-GRADE SPIN WELDING APPARATUS AND METHOD.

BACKGROUND

1. The Field of the Invention

This invention relates to joining plastics and, more particularly, to novel systems and methods for joining plastics of dissimilar grade.

2. The Background Art

In spin welding two parts together, also known as rotary friction welding, one part is typically held stationary, while the other part is rotated in relative rotation thereagainst. The heat generated by the friction between the two parts causes portions of both to melt. Accordingly, once relative rotation between the parts ceases, the melted material cool sand solidifies, leaving the parts chemically bonded together.

It has been discovered that the processes for friction welding or spin welding of polymeric resins of similar grade operate within certain parameters. For example, in conventional spin welding, with proper contact pressure, less than one full turn is required to generate the necessary heat and subsequent melting. These parameters however, are ineffective when resins of differing grades (i.e., cross-grade materials) are involved. The material with the lower melt point or higher melt flow index cannot maintain contact pressure or provide heat sufficient to melt the other material.

For example, it has been found that the typical 50 to 200 feet per minute of frictional travel between parts (e.g., 50 to 200 RPM on a 4 inch diameter part) is inadequate to obtain bonding in a cross-grade structural system. Likewise, it has been found that conventional interferences (required to provide friction and the cohesive material) are completely inadequate if the materials in the structure are selected from cross-grade resins.

Any friction-based welding of cross-grade components results in a preferential melting of the component having the higher melt flow index. That is, the component that melts at a lower temperature, or which flows easier, will preferentially melt, and may completely melt, before any substantial melting has occurred in the other component having a lower melt flow index.

Accordingly, a new set of operating parameters is required in order to make a friction-based or thermal weld using friction as the thermal mechanism. That is, for example, two materials that are chemically substantially the same, or closely similar in molecular structure may be melted in an injection molding machine or an extrusion machine, and form adequate components or parts. However, friction-based welding, and in particular, spin welding between a molded component (e.g. high melt index) and an extruded component (e.g. low melt flow index) has not been found to work previously.

BRIEF SUMMARY OF THE INVENTION

In view of the foregoing, in accordance with the invention as embodied and broadly described herein, a method and apparatus are disclosed in one embodiment in accordance with the present invention as including structures assembled from parts that have been previously molded, extruded, etc. of differing grades of polymeric resins. For example, two parts, each formed of a different grade of polymeric resin may be structured to provide several features or elements that contribute to forming a suitable friction-based, and particularly a spin-welded, cohesive bond. That is, a bond involving only the base materials. This is in contrast to an adhesive bond or solvent bond where some other resin or solvent, respectively, is added in addition to the base materials. Typically, adhesive bonds may even include chemicals that are substantially different from either one of the base parts.

In a friction-based welding process for polymeric components or parts, only the base materials of the two pieces being welded are involved in the welding process. In one embodiment, additional material may be placed, independently from each of the parts, to provide material therebetween for bonding. However, this may be more complicated and less cost effective. This is particularly so considering that building up a particular surface to provide additional interference material from one of the parts, provides both frictional force, interference, and the cohesive material needed to engage both pieces in the bonding process.

Thus, in one embodiment of an apparatus and method in accordance with the invention, each part may be structured to be of a size sufficient to tolerate preferential melting of one of the materials. This is typically embodied in making a wall thickness of the part having the lowest processing melt temperature or the highest melt flow index of sufficient thickness to leave structural strength (e.g. for maintaining contact pressure) remaining even after a significant portion of that wall has been liquified by the addition of frictional energy.

In a conventional spin-welded bond, wherein both parts are of substantially the same grade of plastic material, any bond is enough bond between two molecules of the plastic involved. Thus, bonds can be extremely shallow, extending from the surface only a short distance. Accordingly, mold release could not be used in the fabrication of the such parts. That is, where a weld is only going to affect a very shallow portion of a surface of material, any significant amount of mold release on that surface can substantially interfere with the proper chemical bonding of parts.

By contrast, in an apparatus and method in accordance with the invention, substantial amounts of the materials are involved in the mixing associated with the bonding process, and mold release has not been shown to be problematic. Due to preferential melting with cross-grade bonds in accordance with the present invention, the material that is preferentially melted must typically have a greater thickness to provide both structure and material to absorb heat and thus support the dwell time sufficient to propagate sufficient heat into the less easily melted material. Thus, the bond will typically involve much more of the material, will involve more mixing, but will result in a strong chemical bond between parts of differing grades.

It has been discovered that the wall of the material being bonded benefits from being sufficiently thick to provide a heat sink capacity. In conventional welding techniques, the limited heat sink capacity was adequate, since welds were very superficial at the surfaces. However, such limited heat sink capacity has been found to be inadequate when welding resins of differing grades.

Another element that has been found useful is to provide a structural containment region of sufficient strength to support the contact pressure and contain the liquid pool associated with the operational friction. For example, in one embodiment, a product made in accordance with the invention may be a spool or reel. The spool may include a flange at each end with a tube, to be secured to each flange, extending therebetween. The flanges are typically formed using an injection grade material. The tube is typically formed using an extrusion grade material. Accordingly, spin welding the flanges to the tube may involve cross-grade welding.

Tubes in general may be formed in accordance with the invention by blow molding, extrusion, roto molding, injection molding, rolling from a sheet, or the like. Extrusion has been found to be cost effective and readily available from vendors of machines, services, or product. Extrusion is used herein only by way of example.

Flanges may be formed in accordance with the invention by blow molding, roto molding, injection molding, thermo forming, pressure forming, stamping, compressions molding, fabricating from stock, or the like. Injection molding is likewise readily available from vendors of machines, services, or product. Thus, injection molding is used herein only by was of example. Thus, injection and extrusion are two typical processes whereby parts of disparate melt flow index may result and require suitable bonding in accordance with the invention.

In selected embodiments, a flange may be provided with a circular or cylindrical slot or recess in the face thereof. The slot may be sized to receive the circular end of the tube. Accordingly, the tube may be spun down into the slot. Interference of the tube with the walls of the slot may provide frictional forces, which generate heat. This heat may melt portions of the tube and slot. Typically, the two walls of the slot direct heat from both sides into the wall of the tube, increasing thermal load and encouraging melting of the surfaces of the tube. Accordingly, when the tube and flange are left stationary, the liquid resin may cool and solidify to form a cohesive bond.

Such a bond may provide a structure of solid material extending from an outer portion of the flange outside the diameter of the tube, through the tube wall, and into an inner portion of the flange located inside the inner diameter of the tube. Thus, flanges so assembled and secured are not as susceptible to bowing or distortion when subjected to axial loads.

Alternatively, or in combination with a cylindrical slot, a flange may include a cylindrical support sleeve extending from the face of a flange, to be positioned inside a tube. In such an embodiment, friction-based welding or bonding may occur between the inner surface of tube, and the outer surface of the sleeve. Thus, the tube may be spin welded to the support sleeve, the cylindrical slot, or some combination thereof.

In selected embodiments, interference material may be formed on the exterior surface of a sleeve and on one or more sides of a slot (e.g., inside diameter or outside diameter of the slot). Accordingly, spinning the tube down over a sleeve, into a slot, or some combination thereof may cause an interference between the tube and the flange.

The interference material may be provided in any suitable manner. For example, in selected embodiments, the wall of a slot may be tapered or stepped in thickness on the inner diameter of the slot exposed to the inner surface of the tube. In other embodiments, both the inner and outer diameters of the slot may be tapered or stepped to provide the interference distance and material. In certain embodiments, the interference may increase as the tube penetrates deeper into the slot. Accordingly, further into the slot, the tube encounters more material, more pressure, and, consequently, greater heat-generating resistance.

In one embodiment, a slot may have a uniform interference at any given point. In other embodiments, a slot may include a clearance region. This clearance region may permit a tube to fully align with and enter a slot before any substantial melting. Accordingly, alignment may be facilitated and the possibility and amount of flash extruded out from the joint region may be minimized or eliminated.

In current systems for spin welding, a protrusion, when spun into a slot, recess, or cavity, is not inserted deeper than approximately 1.2 to 1.5 times the wall thickness of the protrusion. More depth using parts having the same grade of material will typically result in destruction of the base structures. That is, heat penetrating into the wall of the protrusion will enter from both the end and the sides. Thus, the entire wall will melt if the wall penetrates a distance much greater than the thickness thereof.

By contrast, in an apparatus and method in accordance with the invention, a tube formed of a extrusion grade material may typically spin into a slot having a depth substantially greater than 1.5 times the wall thickness of the tube. This is possible because the tube material does not melt as easily, or as quickly, as the material forming the flange.

By taking advantage of the possibly lower processing melt temperature of the flange, and the lower melt flow index and possibly higher processing melt temperature of the tube, the structural shape of the tube may be maintained while it is forced down into the slot. Thus, a deeper weld is formed, and a longer engagement depth will result. Meanwhile, additional interference thicknesses provide more material to engage in the bonding process, as well as greater frictional forces to generate more heat to melt the material having the higher processing melt temperature and lower melt flow index.

In one embodiment of an apparatus and method in accordance with the invention, the manufacturing machine for producing spin welds may provide interlocking and automatic cycle control after shields are closed on the parts positioned and chucked into the machine for spinning. Photoelectric sensors systems may be used to control the relative positions of parts and the machine in forming the welding between parts. Suitable clamps, spindles, bearings, motors, connections, and the like are embodied in an apparatus for making spools and reels in accordance with the invention. Automatic computerized controls are also relied upon in certain embodiments for controlling the cycling distances, loads, and times of the welding machine in forming spools and reels in accordance with the invention. In one embodiment, a machine in accordance with the present invention may simultaneously spin-weld a flange on both ends of a tube.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
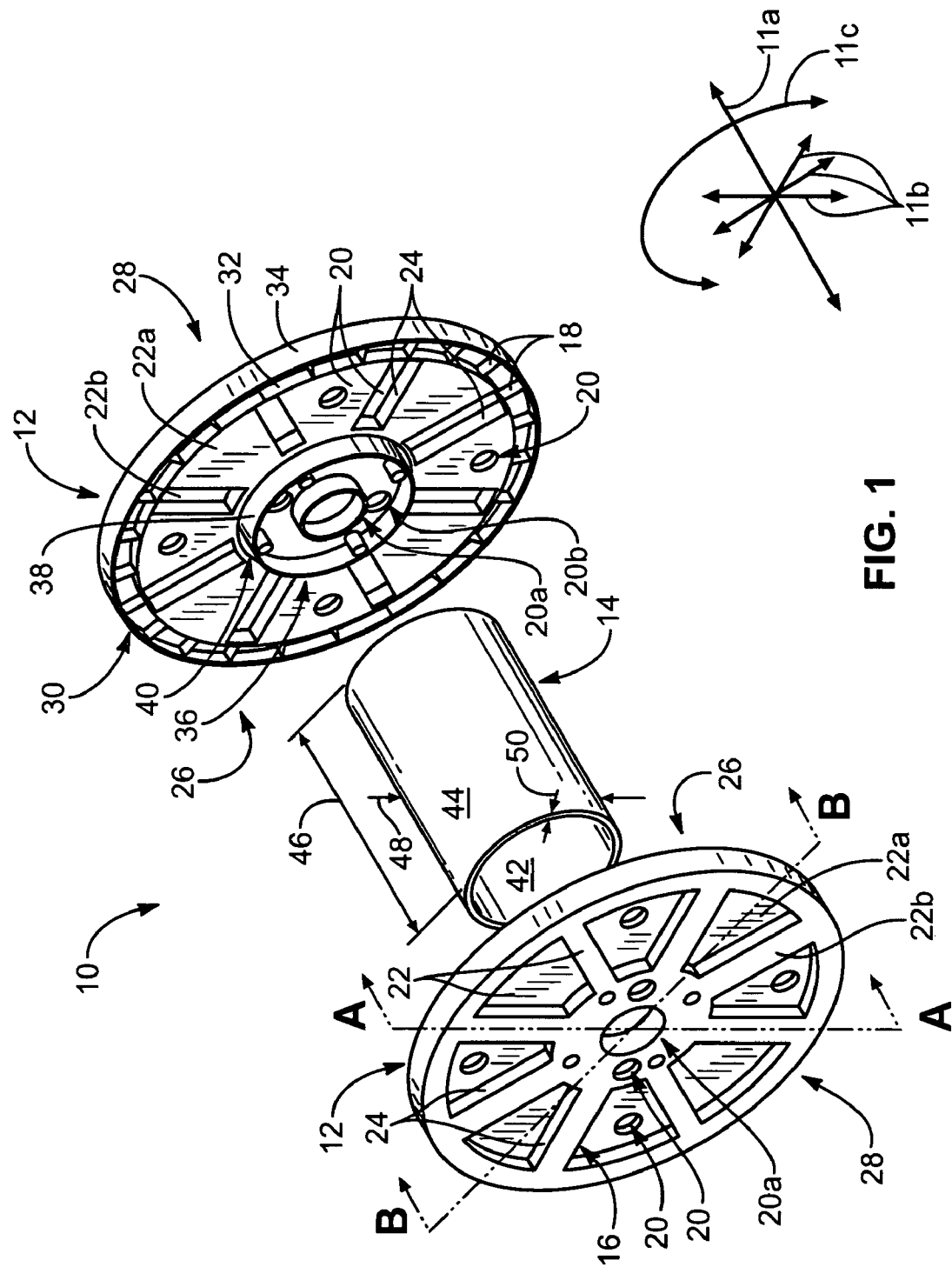
FIG. 1 is an exploded, perspective view of a spool or reel having corrugated flanges and a tube that are susceptible to joining by spin welding in accordance with the present invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of apparatus and methods in accordance with the invention. The illustrated embodiments of the invention will be best understood by reference to the drawings, wherein like parts are designated by like numerals throughout.

In certain embodiments, an apparatus and method in accordance with the invention may involve structural systems formed of two or more individual parts made using polymeric resins of differing grades. For example, one part may be made from an injection grade polymeric resin, while another may be made from an extrusion grade polymeric resin.

Grades may differ because they have different, typically substantially different, melt flow indices. The melt flow index is a measurement of the number of grams of a resin that pass through a testing orifice, following the addition of a selected amount of heat and pressure. Grades may also vary as to processing melt temperature. Even materials that appear chemically equivalent, may have substantial cross-linking that will affect melting temperature.

The overall rheology of a resin may relate to viscosity, density, and so forth as dictated by the chemical structure of the resin, the length molecules, the number of molecular bonds, and the like. For example, a longer molecule may be expected to provide a higher viscosity. Typically, a long chain polymer will be tougher. Cross linking between chains may affect elasticity, rigidity, melt temperature, and the like. In general, the melt flow index quantifies a significant portion the polymeric resin's rheological characteristics.

The resistance to flow exhibited by a polymeric resin often determines its utility. Certain processes require polymeric resins that flow relatively easily. Other processes require polymeric resins that flow, but maintain a certain amount of resistance or even structural rigidity. For example, in an injection process, the resin must melt to a liquid state and flow. In an extrusion process, a resin may maintain substantially more mechanical integrity. That is, an extruded component leaves the extrusion die having a substantial degree of mechanical stability. Accordingly, injection grade polymeric resins melt easier, melt to a greater extent, flow easier, and typically include molecular strings of shorter length.

Injection grade polymeric resins may have a melt flow index typically of from about 4 to about 30. Applicant has tested the invention with resins having indices from 2 to over 30, even up to 100. For example, injection grade olefinic resins (e.g., polyethylene and the like) typically have melt flow indices in the range of approximately 6 to 20. Likewise, a typical melt flow index for a polystyrene resin will be in the range of from about 6 to about 12, with 8 being a typical value. Thus, even injection grade resins having disparate melt flow indices benefit greatly from the invention.

An extrusion grade polymeric resin may often have a fractional value of melt flow index. For example, extrusion grade olefinic resins may typically have a melt flow index of from about 0.1 to about 1. Typically, most practical extrusion grade polymeric resins have a melt flow index in the range of from about 0.3 to about 1. However, polymeric resins that have short molecules may support extrusion at slightly higher melt flow indices. For example, extrusion grade polystyrene may be in the range of from about 2 to about 4.

To the extent that such polymeric resins form a solid or a rigid product, rather than an elastomeric product, they are typically bound between molecular chains to a greater extent by Van der Waals Forces or simply entanglement. Products formed of such injection grade polymeric resins may sometimes be considerably more brittle than a similar product made of an extrusion grade polymeric resin.

Referring to FIG. 1, it may be noted that the spin welding or friction welding apparatus and methods described hereinbelow may be applied to a wide variety of products. These apparatus and methods will be discussed using spools 10 and reels 10 as illustrative examples. However, those of ordinary skill in the art may easily apply the apparatus and methods of the present invention to a wide variety products.

Accordingly, in selected embodiments, spools 10 or reels 10 comprising cross-grade components may be spin welded in accordance with the present invention. Such spools 10 may define coordinate axes comprising an axial direction 11a, radial direction 11b, and circumferential direction 11c. A spool 10 may include a flange 12 at each end with a tube 14, to be secured to each flange 12, extended therebetween. The tube 14 may support wrapping of a stranded material, such as chain, wire, cable, rope, ribbon, or the like. The flanges 12 may stop the different layers of the stranded material from sliding axially off the tube 14.

Due to geometric considerations, flanges 12 are typically formed in an injection molding process, and thus are typically formed using an injection grade material. Also due to geometric toughness, and efficiency considerations, tubes 14 are typically formed in an extrusion process, and thus are typically formed using an extrusion grade material.

Flanges 12 in accordance with the present invention may include various corrugations 16, ribs 18, or combinations thereof. They may also include various apertures 20, such as arbor apertures 20a, drive apertures 20b, and the like. U.S. Pat. No. 6,598,825 (issued Jul. 29, 2003 and entitled SIMULTANEOUS-ACCESS SURFACES FOR REEL-FLANGE FASTENERS) describes various flanges that may be applied to the present invention and is hereby incorporated by reference.

In selected embodiments, a flange 12 may include corrugations 16 comprising various web portions 22. Each web portion 22 may be offset in the axial direction 11a from adjacent web portions 22. The corrugations 16 may also include various connecting walls 24. Each connecting wall 24 may extend between, and substantially orthogonally with respect to, adjacent web portions 22. In certain embodiments, the web portions 22 and connecting walls 24 are both substantially planar.

If desired, web portions 22 may have alternating shapes. For example, in one embodiment, web portions 22a on the face 26 (i.e., the inner surface or surface closest to the tube 14) of a flange 12 may increase in the circumferential direction 11c while traveling in the radial direction 11b. Accordingly, such web portions 22a may be shaped like a piece of pie. In contrast, web portions 22b on the back 28 (i.e., the outer surface or surface farthest from the tube 14) of a flange 12 may have a constant dimension in the circumferential direction 11c while traveling in the radial direction 11b.

In selected embodiments, a flange 12 may include a crumple zone 30 forming the outer edge thereof. The crumple zone 30 may include an inner wall 32 and an outer wall 34, both extending in the circumferential direction. The outer wall 34 of the crumple zone 30 may form the outer edge of the flange 12. The crumple zone 30 may also include various ribs 18 extending between the inner and outer walls 32, 34. Accordingly, if a such a flange 12 were dropped, the ribs 18 of the crumple zone 30 would buckle, deflect, or otherwise deform to absorb much of the impact of the fall. This absorption of energy may limit the amount of damage produced in other parts of the flange 12 or in the rest of the spool 10. Moreover, a deformed crumple zone 30 will typically not affect the ability of the spool 10 to receive or dispense stranded material.

In selected embodiments, a flange 12 may include a tube interface 36. A tube interface 36 may facilitate securement of the tube 14 to the flange 12. In some embodiments, a tube interface 36 may comprise a cylindrical support sleeve 38 extending in the axial direction 11a from the face 26 of a flange 12. In other embodiments, a tube interface 36 may comprises a circular or cylindrical slot 40, recess 40, or cavity 40 formed in the face 26 of the flange 12. In still other embodiments, a tube interface 36 may comprises both a sleeve 38 and a slot 40.

A tube 14 may have an inner surface 42 and an outer surface 44. A tube 14 may also be characterized by a length 46, diameter 48, and wall thickness 50. In selected embodiments, the diameter 48 and wall thickness 50 of a tube 14 may be selected such that the inner surface 42 of the tube 14 may slide over the sleeve 38 of the flange, the end of the tube 14 may be admitted within the cylindrical slot 40, or the tube 14 may slide over the sleeve 38 and be admitted within the slot 40.

Figure 2:
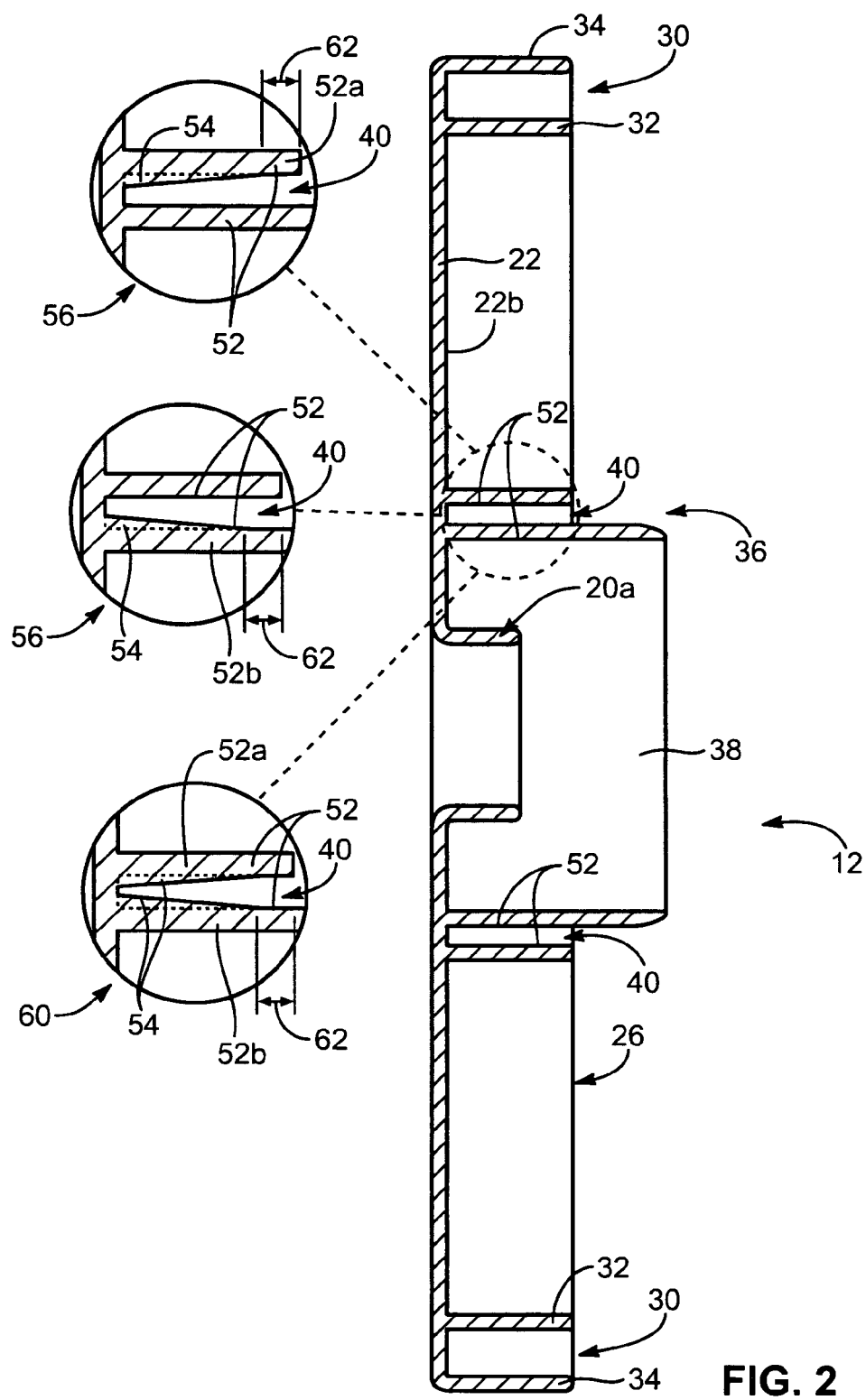
FIG. 2 is the AA cross-sectional view of one of the flanges of FIG. 1 having a tube interface comprising a support sleeve and a cylindrical slot.

Referring to FIG. 2, during assembly, a tube 14 may be spun down over a sleeve 38 and into a slot 40. Interference of the tube 14 with the walls 52 of the slot 40 or sleeve 38 may provide frictional forces, and material to be heated by those frictional forces, to bond the wall of the tube 14 to the walls 52 of the slot 16.

In selected embodiments, interference material 54 may be formed in the slot 40 by tapering one or more of the walls 52 of the slot 16. For example, in one embodiment 56, an outer wall 52a of the slot 40 may be tapered to include interference material 54. In another embodiment 58, an inner wall 52b of the slot 40 may be tapered to include interference material 54. In yet another embodiment 60, both an outer wall 52a and an inner wall 52b of the slot 40 may be tapered to include interference material 54. Using such tapers, the interference is increased as the tube 14 penetrates deeper into the slot 40.

In certain embodiments, a clearance region 62 may provide a location for a tube 14 to align with and enter a slot 40 before doing any substantial melting that might force material out. A clearance region 62 may facilitate alignment. It may also limit the amount of flash extruded out during welding.

Figure 3:
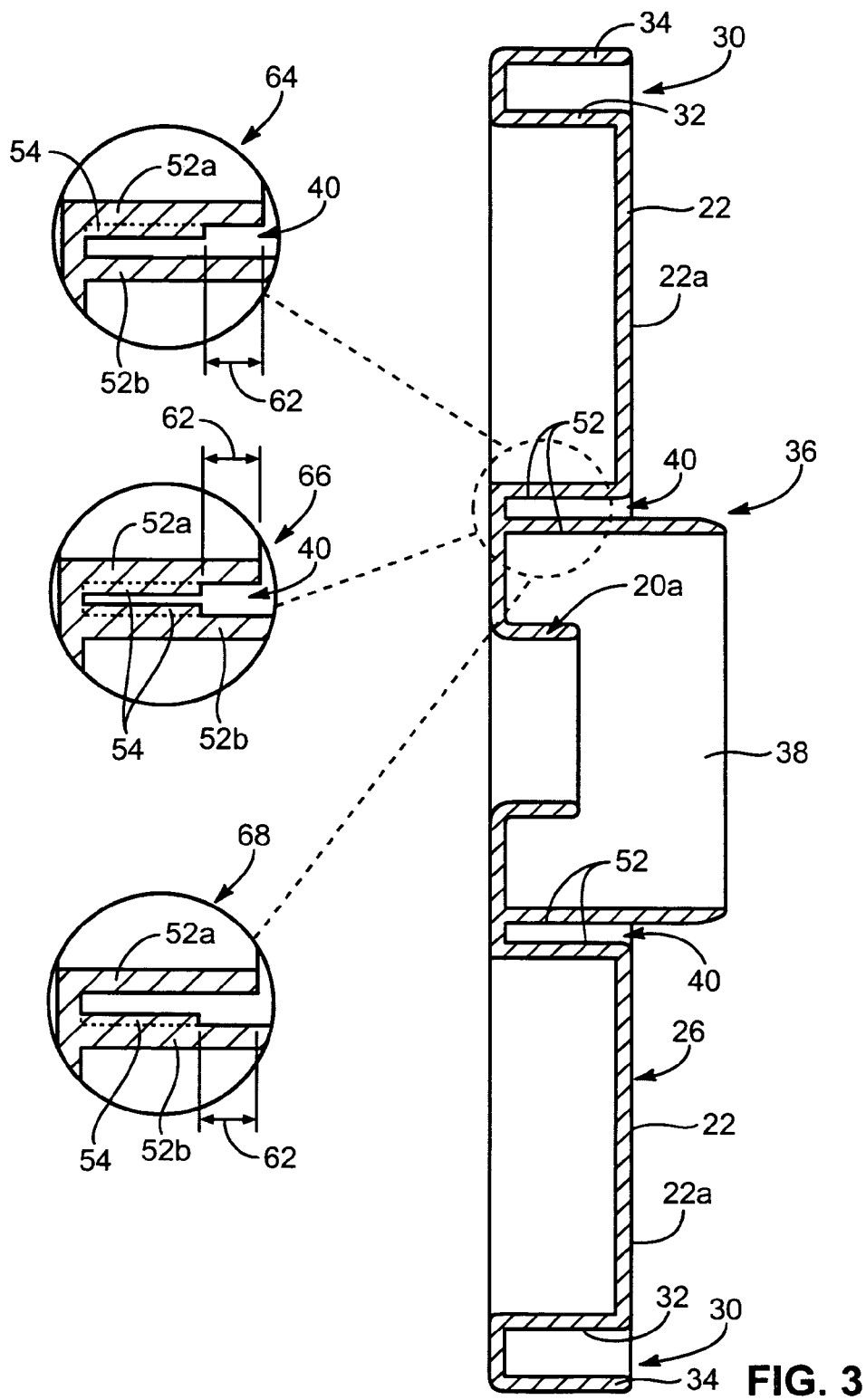
FIG. 3 is the BB cross-sectional view of one of the flanges of FIG. 1 having a tube interface comprising a support sleeve and a cylindrical slot.

Referring to FIG. 3, in selected embodiments, interference material 54 may be formed in the slot 40 by incorporating a step change in one or more of the walls 52 of the slot 16. For example, in one embodiment 64, an outer wall 52a of the slot 40 may include a step change to provide the interference material 54. In another embodiment 66, an outer wall 52a and an inner wall 52b of the slot 40 may each include a step change to provide interference material 54. In yet another embodiment 68, an inner wall 52b of the slot 40 may include a step change to provide interference material 54. In general, interference material 54 may be incorporated within a slot 40 in any suitable shape and manner.

Figure 4:
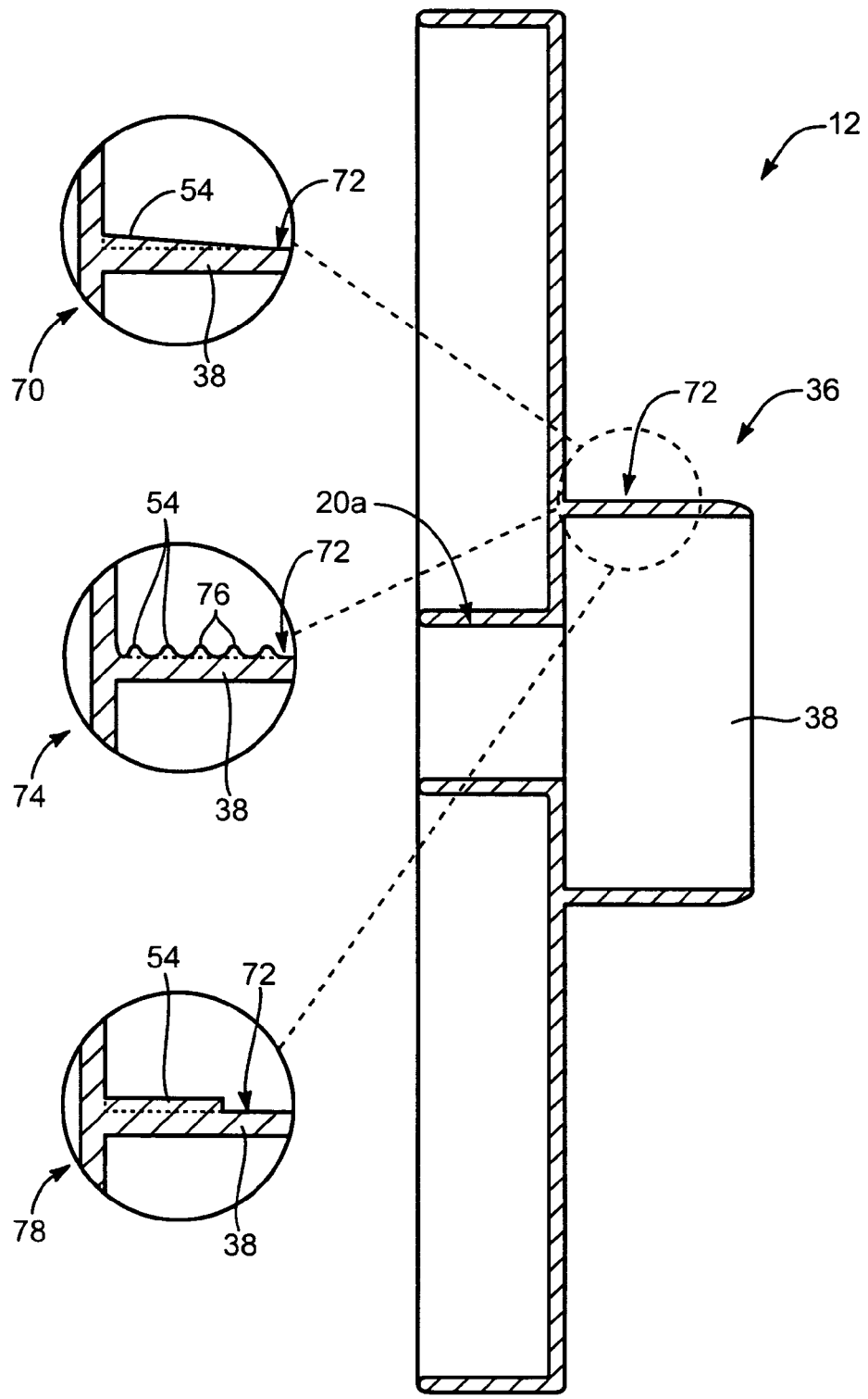
FIG. 4 is a cross-sectional view of a flange having a tube interface comprising only a support sleeve.

Referring to FIG. 4, in selected embodiments, a tube 14 may secure to a flange 12 solely by engaging a cylindrical support sleeve 38. In such embodiments, the sleeve 38 may include interference material 54 arranged in any suitable pattern. For example, in one embodiment 70, an outer surface 72 of the sleeve 38 may be tapered to include interference material 54. In another embodiment 74, an outer surface 72 of the sleeve 38 may include one or more extensions 76 or ridges 76 to provide interference material 54. In yet another embodiment 78, an outer surface 72 of the sleeve 38 may include a step change to provide interference material 54.

Figure 5:
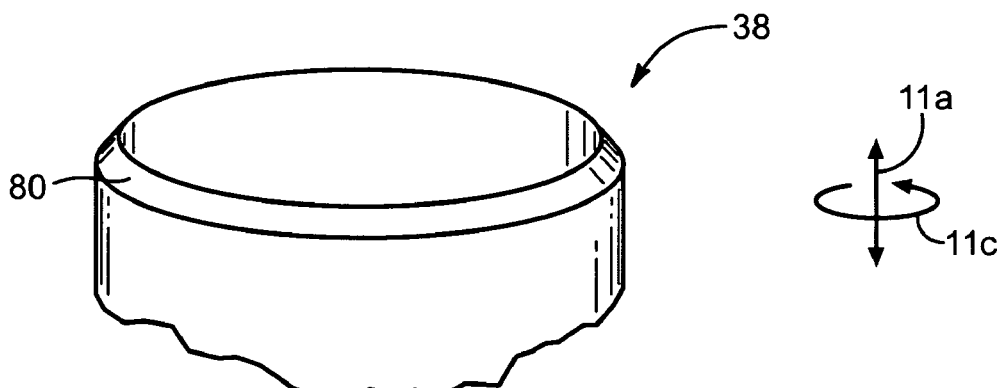
FIG. 5 is a partial, perspective view of a continuous support sleeve in accordance with the present invention.

Referring to FIG. 5, in selected embodiments, a sleeve 38 may be shaped to facilitate alignment and securement with a tube 14. For example, a sleeve 38 may be piloted 80 with respect to the tube 14. A pilot 80 formed on a sleeve 38 may align the inner diameter of a tube 14 with the outer diameter of the sleeve 38. A pilot 80 may include a taper, step, chamfer, rounding, and the like, or some combination thereof. In one embodiment, a tube 14 may be molded, rather than extruded, and thus have a taper, chamfer, step, etc. formed therein to facilitate piloting onto a sleeve 38 designed to receive it.

Figure 6:
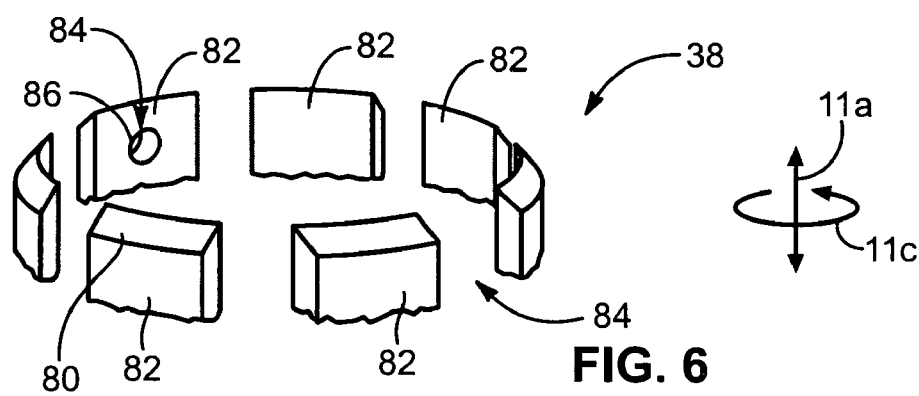
FIG. 6 is a partial, perspective view of a discontinuous support sleeve in accordance with the present invention.

Referring to FIG. 6, in certain embodiments, a sleeve 38 may be formed as a continuous cylinder. In other embodiments, a sleeve 38 maybe discontinuous. For example, in selected embodiments, a sleeve 38 may comprise a collection of tabs 82. A discontinuous sleeve 38 may provide discontinuities 84 were liquified material may escape during welding. Accordingly, a discontinuous sleeve 38 may provide a measure of control over the location and amount of "flash" expelled.

In certain embodiments, it may be undesirable to provide a discontinuous sleeve 38. For example, a discontinuous sleeve 38 may permit excessive amounts of the melted material to escape from the weld zone. This melted material may have otherwise been used to heat and eventually melt a part formed of a resin having a lower melt flow index. Accordingly, in such cases, the number or size of the discontinuities may be limited. For example, if necessary, a discontinuity 84 may simply comprise one or more apertures 86 extending through the wall of an otherwise continuous sleeve 38.

Figure 7:
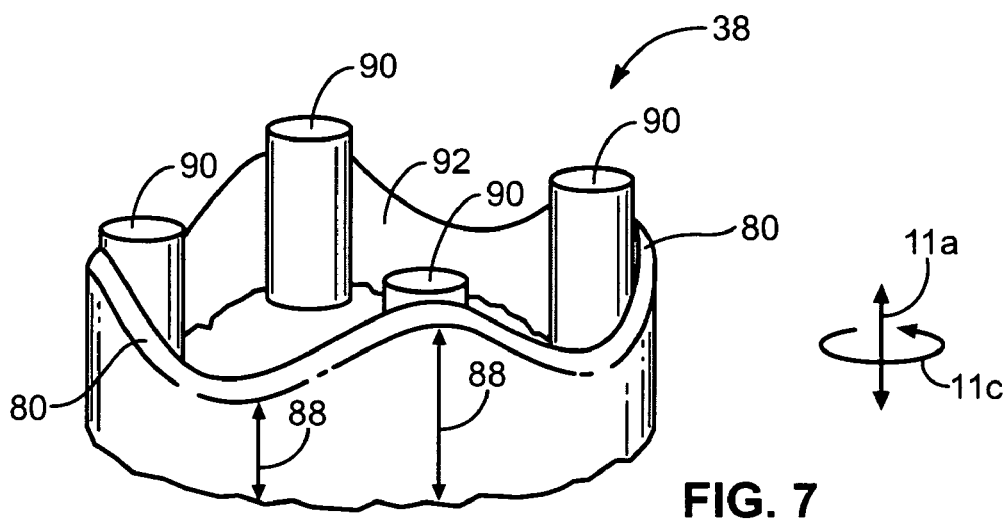
FIG. 7 is a partial, perspective view of a scalloped support sleeve in accordance with the present invention.

Referring to FIG. 7, in selected embodiments, in order to aid alignment, the length 88 of a sleeve 38 in the axial direction 11a may vary. For example, a sleeve 38 may be undulating, forming a somewhat scalloped shape, in an axial direction 11a as one progresses about the sleeve 38 in the circumferential direction 11c. This scalloped shape has been found to reduce centering and aligning difficulties caused by uneven shrinkage (which may distort the circular shape of the support sleeve 38) of a molded flange 12 during post-injection cooling.

In selected embodiments, a flange 12 may include various structures to facilitate engagement during the welding process. For example, in some embodiments, a spindle may engage a flange 12 during spin welding. Accordingly, a flange 12 may have any suitable structures to facilitate engagement with such a spindle.

In certain embodiments, spindle engagement may be supported by one or more receivers 90. A receiver 90 may be an aperture or cavity formed in the flange 12 and shaped to receive one or more extensions formed in the spindle. In some embodiments, the receivers 90 may provide a friction fit over the extensions. Accordingly, once applied to the spindle, the receivers 90 may resist removal of the flange therefrom. In one embodiment, a flange 12 may include four receivers 90 comprising cylindrical cavities formed on the inside surface 92 of a sleeve 38. The receivers 90 may be open on the back surface 28 to engage the extensions of a spindle. In such an embodiment, the scalloped shape of the sleeve 38 may be arranged such that the portions of the sleeve 38 with the greatest length 88 are positioned proximate the receivers 90.

Figure 8:
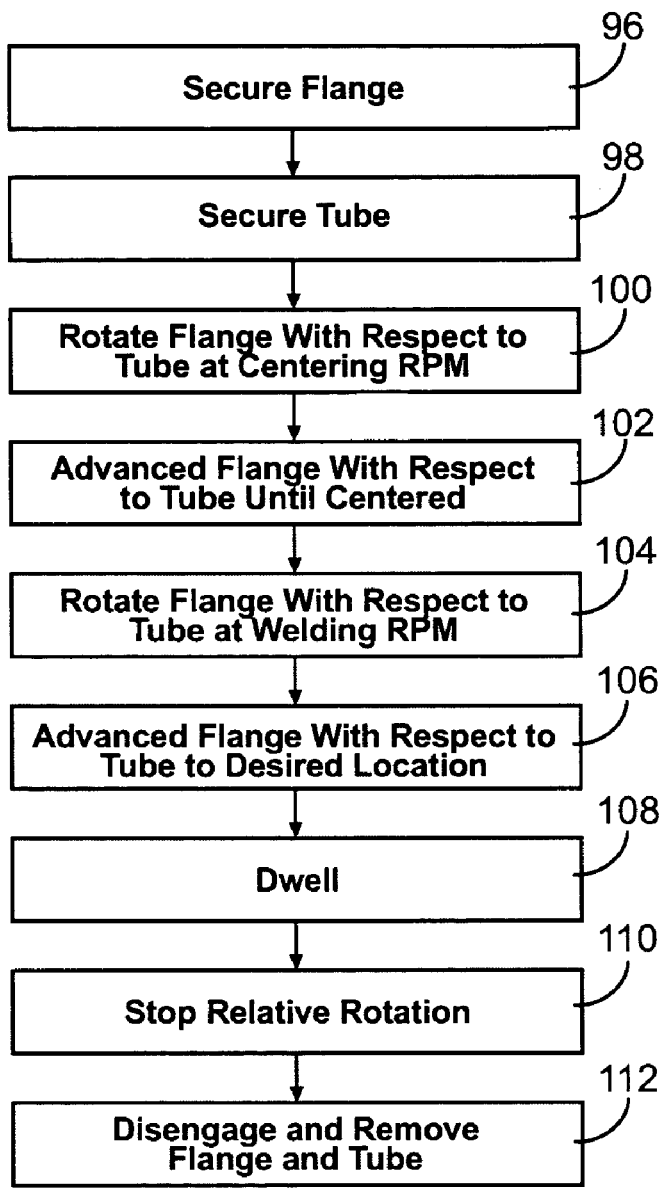
FIG. 8 is a schematic, block diagram of one embodiment of a process for spin welding in accordance with the present invention.

Referring to FIG. 8, in certain embodiments, a spin welding process 94 for securing a flange 12 of greater melt flow index to a tube 14 of lower melt flow index may commence by securing 96, 98 a flange 12 and tube 14 to a machine capable of inducing relative rotation therebetween about an axis extending in the axial direction 11a. In one embodiment, a flange 12 may be rotated 100 at a centering velocity with respect to a tube 14. (Alternatively, the flange 12 may be stationary while the tube 14 rotates or the tube 14 and flange 12 may be rotated in opposite directions.) The centering velocity may be from about 20 to about 500 RPM, and typically on the order of about 200 RPM.

The process 94 may continue by advancing 102 the flange 12 with respect to the tube 14 until the proper alignment is achieved. For example, proper alignment may be achieved when the tube 14 begins to pass over the outer surface 72 of the sleeve 38. Alternatively, proper alignment may be achieved when the tube 14 begins to enter the cylindrical slot 40.

Once the tube 14 and flange 12 are properly aligned, the relative rotation therebetween may be increased 104 to welding speed. In select embodiments, welding speed may be in the range from about 1000 RPM to about 5000 RPM, and has been found suitable at the range of 1500 RPM to about 2000 RPM. However, depending on the diameter 48 of the tube 14, these speeds may vary. In general, the larger the diameter 48 of the tube 14, the lower the welding speed.

While rotating at welding speed, the flange 12 may be advanced 106 with respect to the tube 14 to a desired final position. This final position may represent a final dimension of the spool 10 or reel 10. Once the final position is reached, the relative rotation between the flange 12 and tube 14 may be maintained 108 for a time sufficiently long for melting of the materials to occur. It has been found that operated with a ten to fifteen horsepower motor, a dwell time of from about 0.1 to about 1.0 seconds may be adequate to fully complete a weld of a 5-inch diameter tube 14.

For example, a dwell time of from about 0.3 to 0.5 seconds has been shown to be effective with a speed of about 1500 RPM to 2000 RPM when using tubes 14 of a diameter 48 of about five inches. However, dwell time made be increased or decreased, depending on how much heat is generated while the flange 12 is being advanced 106 with respect to the tube 14 to the desired final position. Once sufficient melting has occurred, rotation may then be stopped 110 and the joined tube 14 and flange 12 removed 112.

Figure 9:
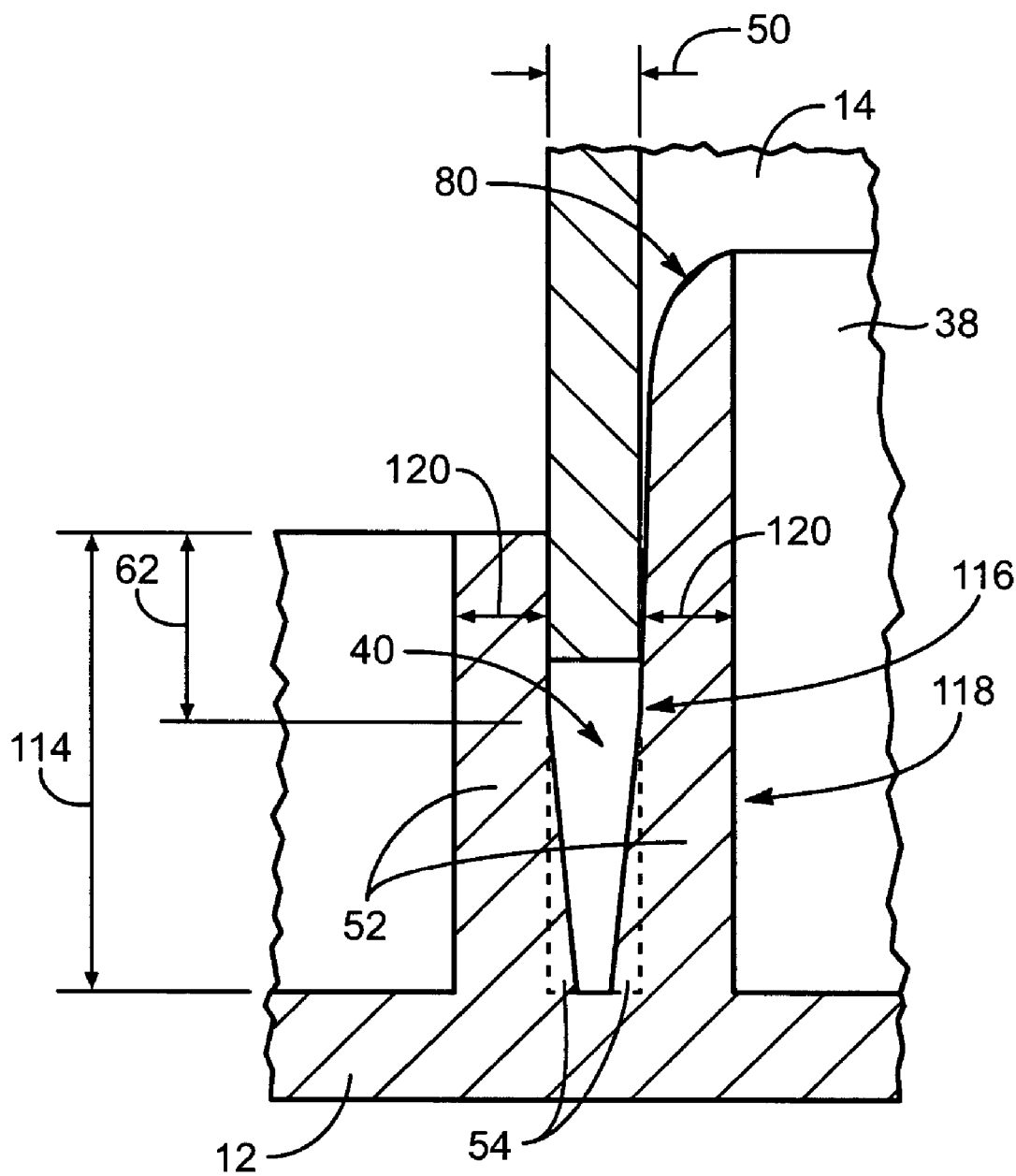
FIG. 9 is a partial, cross-sectional view of a tube just beginning to engage a tube interface comprising a support sleeve and cylindrical slot in accordance with the present invention.

Referring to FIG. 9, in selected embodiments of an apparatus and method in accordance with the invention, a twelve, fourteen, or sixteen inch diameter flange 12 may be welded to a tube 14 having a diameter 48 of about four or five inches. The tube 14 may typically have a wall thickness 50 of from about 0.05 to about 0.2 inches, and typically about 0.1 inches. In such an embodiment, it has been found that a tube 14 formed of an extrusion grade olefinic polymer having a melt flow index of from about 0.3 to about 1.0 may be spin welded to a flange 12 formed of an injection grade olefinic polymer having a melt flow index of from about four to about thirty, and typically in the range of from about six to about twenty.

In one embodiment, a flange 12 may include both a support sleeve 38 and a cylindrical slot 40. Accordingly, the tube 14 may be piloted over the sleeve 38 and down into the slot 40. A slot 40 may have any suitable depth 114. Due at least in part to the different melting characteristics, it has been found that a depth 114 two, three, four, or more times the thickness 50 may be easily tolerated.

To weld cross-grade materials in accordance with the present invention, sufficient heat must be generated in the weld zone 116 to melt both grades of material to a sufficient depth to bond effectively. In general, the amount of heat necessary is determined by the material having the higher melt temperature, lower melt flow index, or both. Various parameters may be increased or decreased to control heat generation. Such parameters may include wall thickness 50 of a tube 14, depth 114 of a slot 40, amount of interference material 54, welding speed, speed of advancement 106, advancement pressure, dwell time, etc.

In selected embodiments, the structures surrounding a weld zone 116 may form a containment region 118. A containment region 118 may be any structure that maintains a significant portion of melted material within the weld zone 116, where it may continue to generate heat and conduct the same to the less easily melted material (e.g., the extruded tube 14). In some embodiments, heat is applied to both sides (and an end, typically) of the less easily melted material.

In one embodiment, a containment region 118 may be provided by external supports that do not become a permanent part of a spool 10. Alternatively, other materials may be embedded or embodied in a part to provide support. For example, metal rings, supports, pins, walls, and the like may be used to construct a containment region 118. In other embodiments, the parts 12, 14 themselves may be provided in sufficient thicknesses, depths, widths, and the like to provide a containment region 118. For example, in some embodiments, a containment region 118 may be formed by the walls 52 of the cylindrical slot 40, the support sleeve 38, or some combination thereof.

Figure 10:
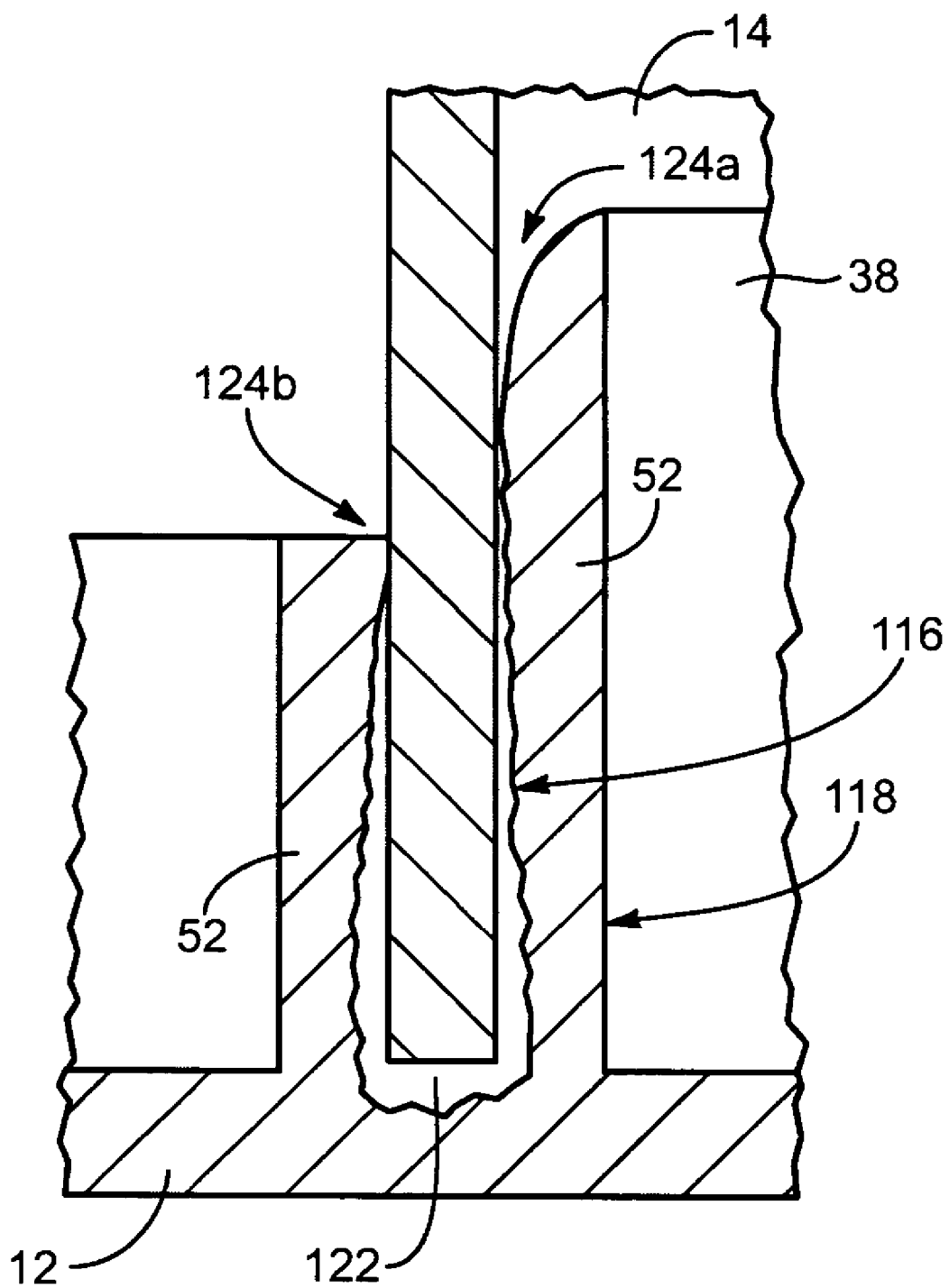
FIG. 10 is partial, cross-sectional view of the structures of FIG. 9 once the tube has been advanced and begun melting portions of a cylindrical slot in accordance with the present invention.

Referring to FIG. 10, due to the inherent characteristics of the extrusion grade polymeric resin of the tube 14 and the injection grade polymeric resin of the flange 12, the material of the flange 12 may be the first to melt and contribute to a liquified region 122 within the weld zone 116. As the material of the flange 12 melts, excess material may be expelled as necessary. In selected embodiments, excess material may escape through a discontinuity 84 in the sleeve 38. In other embodiments, excess material may escape at the inner and outer interfaces 124*a*, 124*b* between the tube 14 and the flange 12. In still other embodiments, a clearance, continuous or otherwise, may preferentially direct excess material to the inner interface 124*a*, where it will neither be seen nor interfere with the stranded material to be wrapped around the completed spool 10.

In embodiments where a containment region 118 is formed by the walls 52 of the slot 40 and the sleeve 38, a substantial portion of these walls 52 may be melted for bonding. However, the walls 52 maintain sufficient solidified material to maintain their structural integrity. Accordingly, the containment region 118 may maintain a significant portion of melted material within the weld zone 116, where it may continue to generate and conduct heat.

Figure 11:
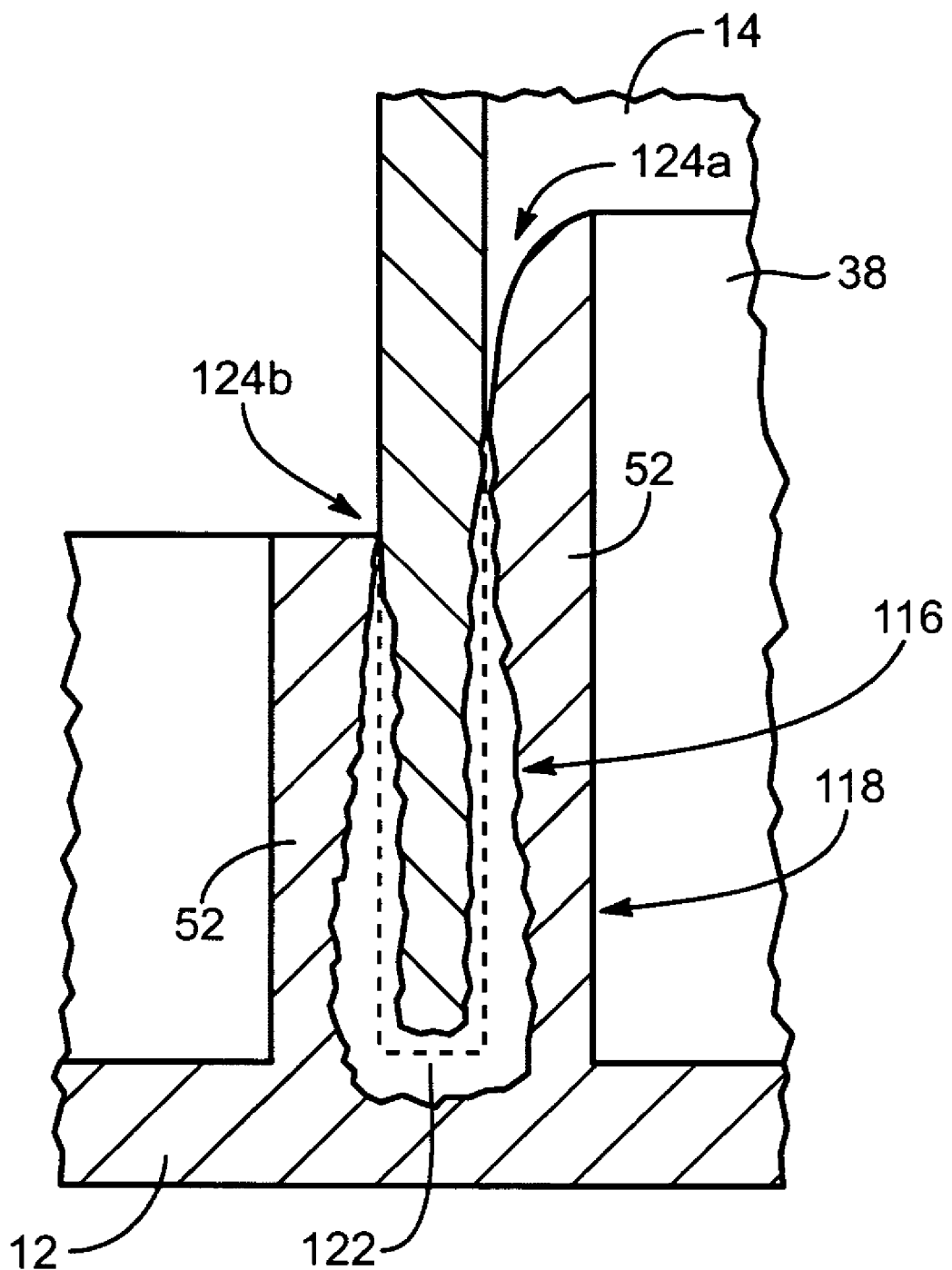
FIG. 11 is a partial, cross-sectional view of the structures of FIG. 9 where a significant portion of both the tube and flange are melted and ready to solidify and bond, the cylindrical slot forming a containment region resisting the escape of the liquified region from the weld zone.
Figure 12:
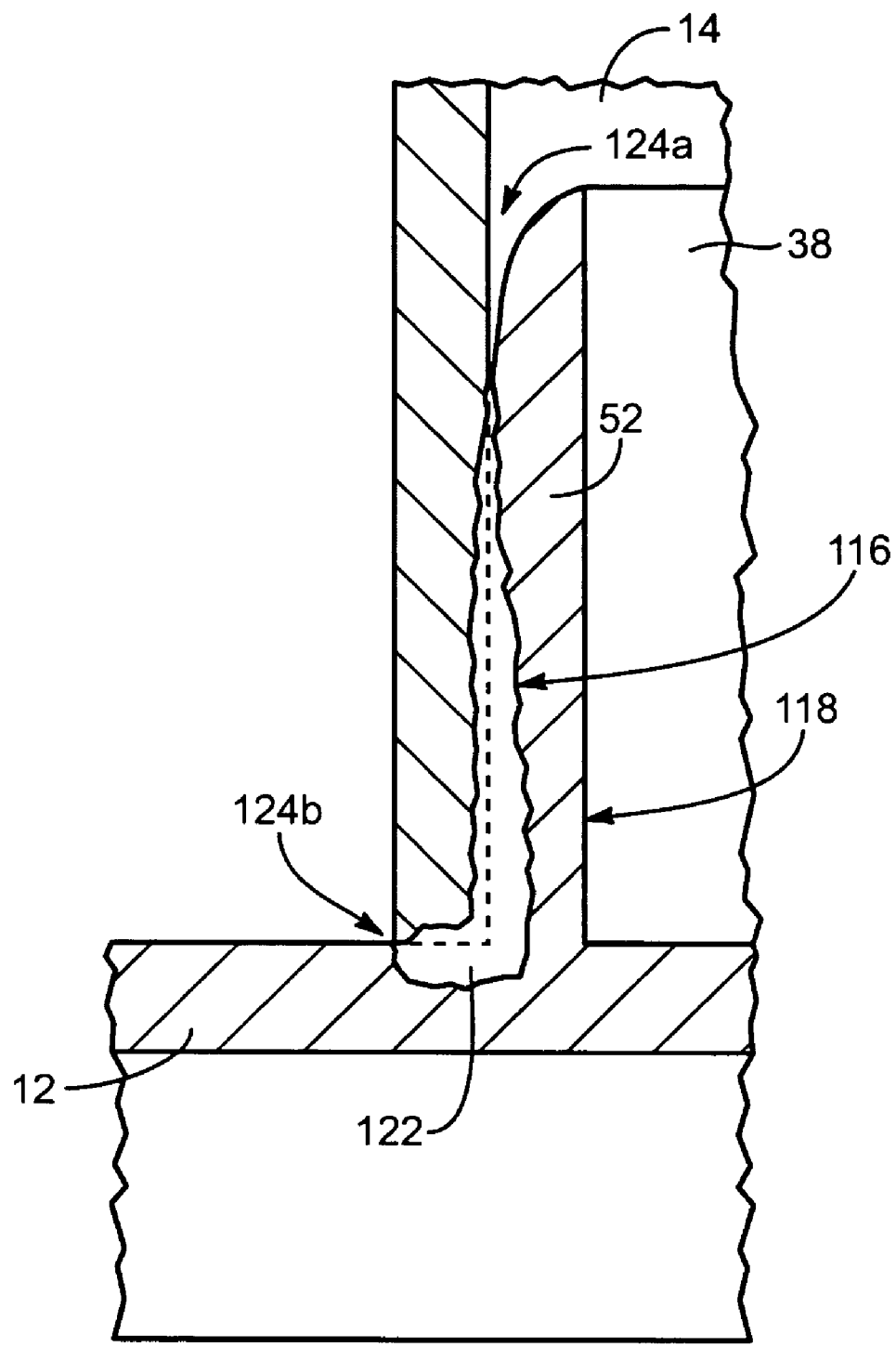
FIG. 12 is a partial, cross-sectional view of a tube engaging a tube interface comprising only a support sleeve, where a significant portion of both the tube and flange are melted and ready to solidify and bond, the sleeve and tube are combining to form a containment region resisting the escape of the liquified region form the weld zone.

Referring to FIGS. 11 and 12, with continued rotation, additional heat may be generated in the weld zone 116. This heat may continue to melt the walls 52 of a slot 40. Eventually, this additional heat will soften and melt portions of the tube 14. Accordingly, material forming the tube 14 may contribute to the liquified region 122. The walls 52 forming the slot 40 may be designed to be sufficiently thick that the tube 14 will begin to melt before the walls 52 of the slot 40 are melted to the point where the structural integrity of the containment region 118 is significantly degraded.

Additionally, the containment region 118 may also provide sufficient mass to act as a heat sink to solidify the liquified region 122 sufficiently quickly to provide adequate cycle times. In certain embodiments, the containment region 118 may provide a heat sink sized to cool a weld zone 116 to below the melt temperature of both materials within a matter of from about half a second to three seconds after the rotation has stopped 110.

In selected embodiments, the containment region 118 may provide a heat sink selected to prevent carbonization. If excessive heat is generated in a polymeric resin, it often drives off selected volatile materials, leaving a substantially carbonized residue behind. If parts are carbonized, the bond may have substantially reduced, or inadequate, strength. Accordingly, by increasing the mass of the containment region 118, a heat sink may be formed to resist the concentration of excessive heat. Thus, the amount of heat that may be generated before carbonization occurs may be substantially increased.

It has been found that an apparatus and method in accordance with the invention may generate friction-based heat in sufficient material to form a fully melted liquified region 122 extending between the tube 14 and the flange 12 for about 0.005 to about 0.03 inches. This is substantially greater penetration than is recognized in the prior art. Accordingly, mold release could not be used in the fabrication of the prior art parts. Where a weld only affects a very shallow portion of a surface of material, any substantial amount of mold release on that surface can substantially interfere with the proper chemical bonding of parts. By contrast, in an apparatus and method in accordance with the invention, substantial amounts of the materials are involved in the melting, mixing, and bonding process, and mold release has not been show to be problematic. For example, bonding integrity has not been significantly affected.

Figure 13:
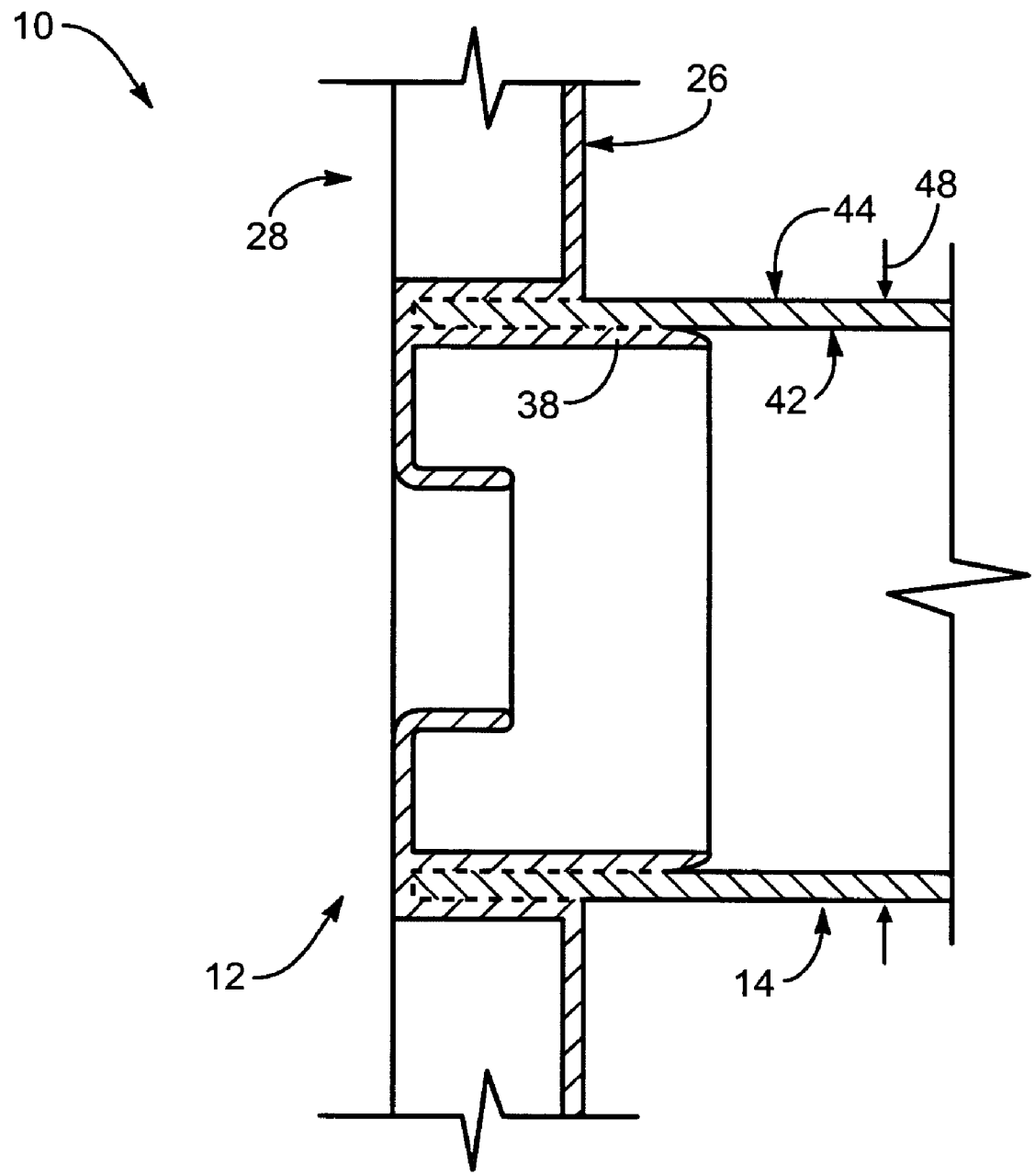
FIG. 13 is a partial, cross-sectional view of a tube welded to a flange having a tube interface comprising a support sleeve and a cylindrical slot in accordance with the present invention.
Figure 14:
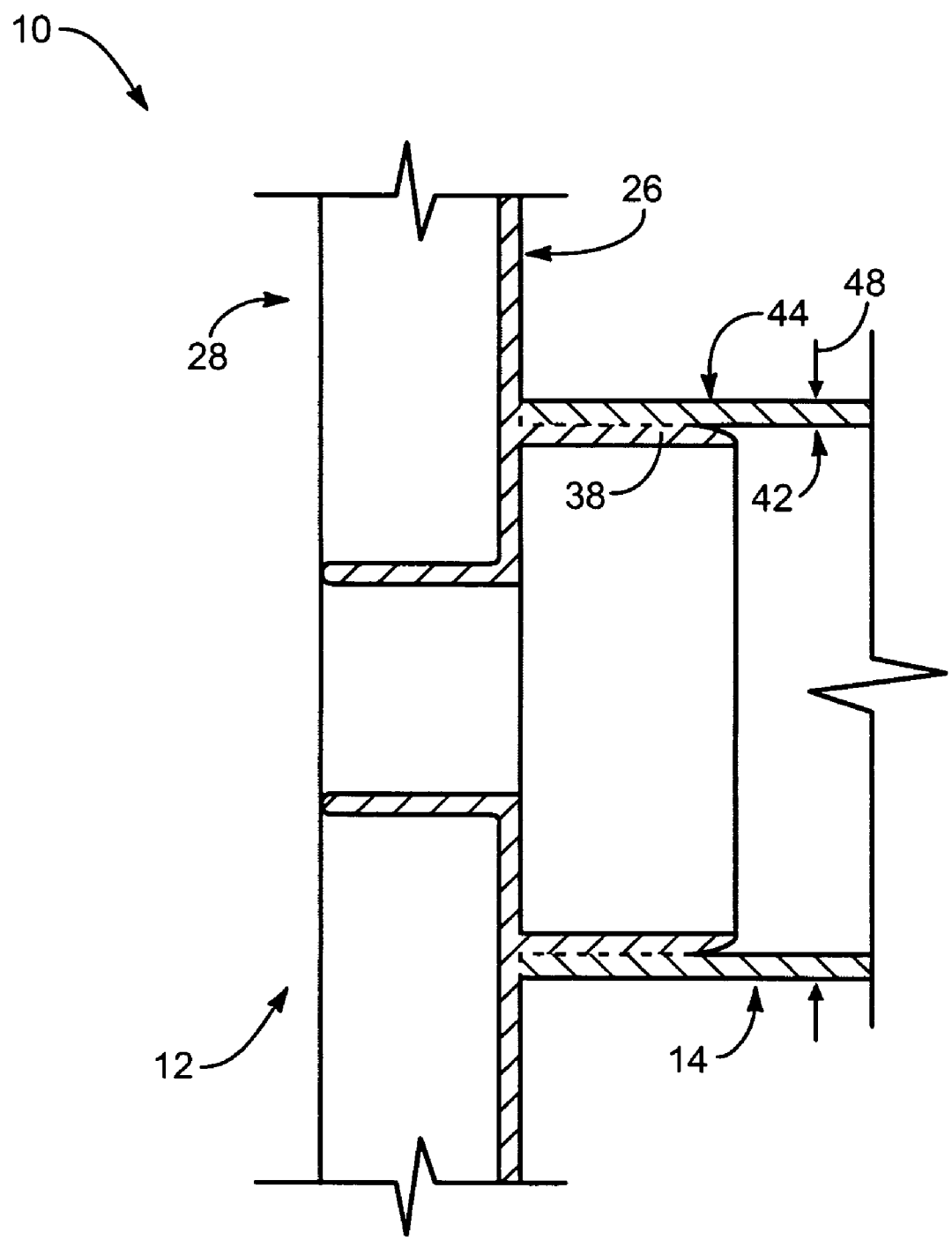
FIG. 14 is a partial, cross-sectional view of a tube welded to a flange having a tube interface comprising only a support sleeve in accordance with the present invention.

Referring to FIGS. 13 and 14, once the liquified region 122 cools, the polymeric resins may solidify, thereby bonding the flange 12 to the tube 14. Due to the strength of the resulting bond, the flange 12 and tube 14 may largely behave as if they were homogeneously formed as a single, monolithic unit. Accordingly, the resulting spool 10 may be quite strong. Additionally, the bending strength of the flange 12 may be greatly improved. Moreover, the susceptibility to bending introduced into the flange 12 by the cylindrical slot 40 may be greatly reduced or even substantially eliminated.

Figure 15:
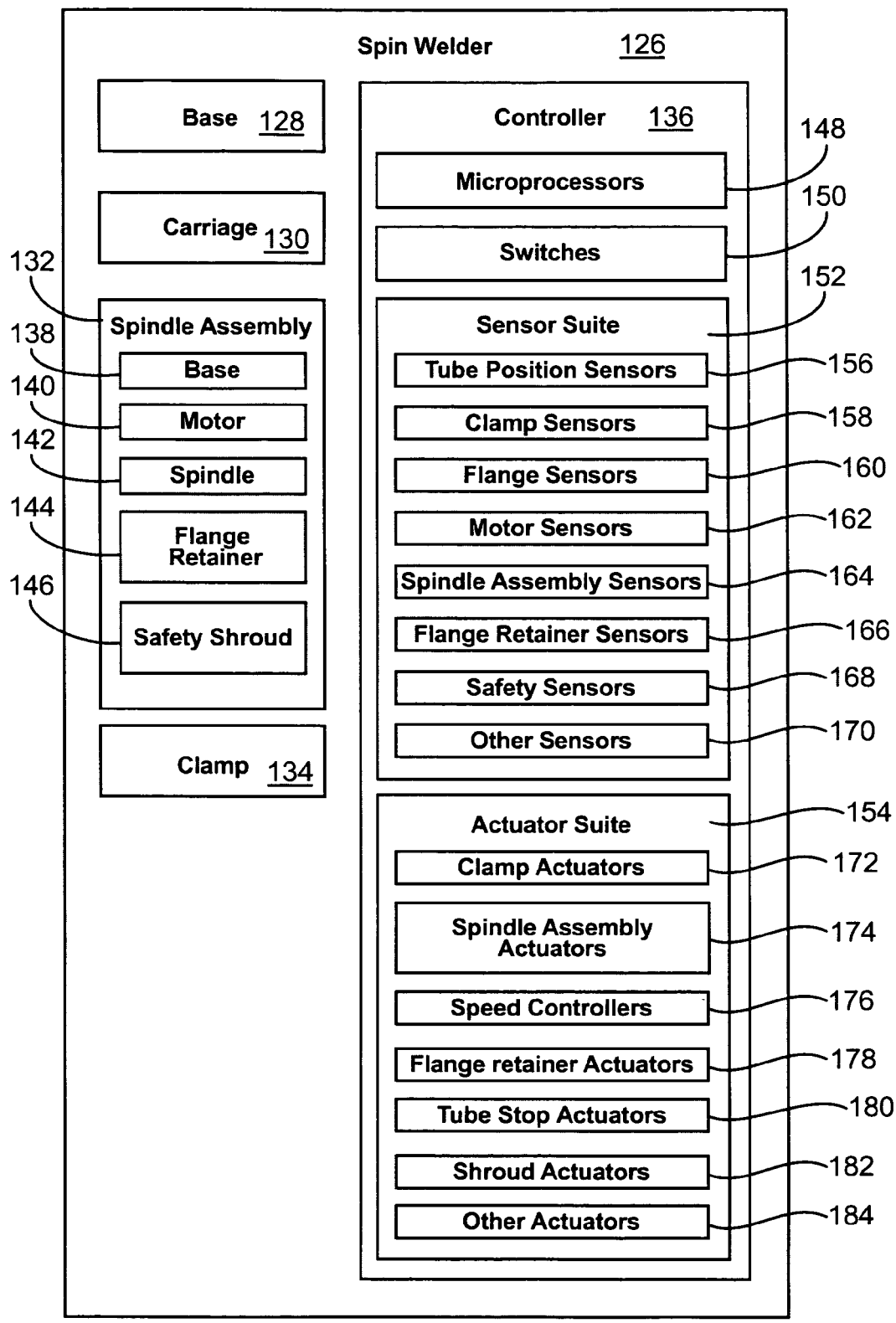
FIG. 15 is a schematic, block diagram of a spin welder for welding in accordance with the present invention.

Referring to FIG. 15, in selected embodiments, a welder 126 for spin welding in accordance with the present invention may include a base 128, a carriage 130, one or more spindle assemblies 132, a clamp 134, and a controller 136. The base 128 may support the welder 126 on a supporting surface at a desired height. If desired or necessary, the base 128 may be sufficiently massive to stabilize the welder 126.

A carriage 130 may be secured to the base 128 to support linear translation therealong. For example, a carriage 130 may include one or more rails supporting linear translation of the spindle assembly 132, clamp 134, etc. on the base 128. In one embodiment, a carriage 130 may include one or more precision linear rails.

A spindle assembly 132 may provide the mechanisms for inducing relative rotation between a flange 12 and a tube 14. A welder 126 in accordance with the present invention may include one or two spindle assemblies 132. For example, a welder 126 with one spindle assembly 132 may weld one flange 12 at a time to a given tube 14. Alternatively, a welder 126 with two spindle assemblies 132 may simultaneously weld two flanges 12 to a given tube 14.

A spindle assembly 132 may have any suitable orientation. In selected embodiments, the orientation may be selected to promote ease of use. For example, in one embodiments, a welder 126 having a single spindle assembly 132 may be oriented to induce rotation about a vertically extending axis. Alternatively, a welder 126 having two spindle assemblies 132 may be oriented to induce rotation about a horizontally extending axis. In either case, the base 128 and carriage 130 may be adapted accordingly.

In selected embodiments, a spindle assemble 132 may include a base 138, motor 140, spindle 142, flange retainer 144, and safety shroud 146. The base 138 may support the various other components of the assembly 132. Additionally, the base 138 may engage the carriage 130 to translate therealong. The motor 140 may impart rotation to the spindle 142. The motor 140 may directly drive the spindle 142 or impart rotation via selected gears, pulleys, and the like. For example, in selected embodiments using 12 inch to 16 inch flanges with 3 inch to 6 inch diameter tubes, the motor 140 may range in power from about 10 Hp to about 15 Hp. In general, the larger the parts being welded, the larger the power needed in the motor 140.

The spindle 142 may include one or more extensions to facilitate engagement with a flange 12. For example, one or more extension of a spindle 142 may frictionally engage corresponding receivers 90 of a flange 12. Accordingly, in selected embodiments, the back 28 of a flange 12 may be applied directly to the spindle 142. Thus, when the motor 140 imparts rotation to the spindle 142, the flange 12 may be rotated.

In certain embodiments, one or more flange retainers 144 may provide added securement of the flange 12 to a spindle 142. In one embodiment, a flange retainer 144 may include a mechanical stop that may be selectively rotated in front of a flange 12 to resist removal thereof from the spindle 142. In selected embodiments, a flange retainer 144 may be manually manipulated. In other embodiments, the operation of a flange retainer 144 may be automated. For example, in one embodiment, a flange retainer 144 may be pneumatically actuated under the direction of the controller 136.

A safety shroud 146 may protect an operator from injury. For example, a safety shroud 146 may be positioned such that if a flange 12 were to inadvertently separate from a spindle 142, the flange 12 would be blocked from impacting an operator. In selected embodiments a safety shroud 146 may be formed of a clear material to simultaneously provide protection and visual access. A spindle assembly 132 in accordance with the present invention may include any combination of safety shrouds 146, guards, covers, and the like that may be desirable or necessary to protect both the welder 126 and the operator or operators.

In selected embodiments, a clamp 134 may secure a tube 14, while a spindle assembly 132 advances with a spinning flange 12. A clamp 134 may include one or more clamping mechanisms. For example, a clamp 134 may have a first clamping mechanism to secure a first end of a tube 14, while a second clamping mechanism secures a second end of the tube 14. In selected embodiments, a clamp 134 may be manually manipulated. In other embodiments, a clamp 134 may be automated. For example, in one embodiment, a clamp 134 may be pneumatically actuated under the direction of the controller 136. In selected embodiments, the position of a clamp 134 on the carriage 130 may be selectively adjustable to accommodate various sizes of tubes 14.

A controller 136 in accordance with the present invention may include any combination of components necessary to facilitate the operation of the welder 126. In selected embodiments, a controller 136 may include one or more microprocessors 148, one or more switches 150, a sensor suite 152, and an actuator suite 154. In operation, the one or more microprocessors 148 may receive inputs from selected switches 150 and sensors of the sensor suite 152 and issue appropriate commands or instructions as programmed to various actuators of the actuator suite 154.

The switches 150 may include a main on/off switch, as well as other switches controlling the various components of the welder 126. For example, a welder 126 having two spindle assemblies 132 may include a switch 150 for deactivating one such assembly 132. Accordingly, the welder 126 may be used to weld one flange 12 to a tube 14 at a time.

A sensor suite 152 may include sensors 156 sensing the size and proper positioning of a tube 14 in a clamp 134, sensors 158 ensuring proper closure of a clamp 134 by position, load, or the like, sensors 160 sensing the size and proper positioning of a flange 12, and sensors 162 sensing the operating parameters of the motor 140 such as rotational position, speed, current draw, torque, and the like. A sensor suite 152 may also include sensors 164 sensing the position of a spindle assembly 132 on a carriage 130, sensors 166 sensing proper deployment and retraction of the flange retainers 144, and sensors 168 sensing proper closure or orientation of safety shrouds 146. A sensor suite 152 may also include other sensors 170 as needed or desired. The information gathered by the sensor suite 152 may be used to adjust rotational speeds, advancing distances, advancing pressures, dwell times, and the like as necessary to provide the desired quality of weld.

An actuator suite 154 may include actuators 172 selectively opening and closing a clamp 134, actuators 174 selectively manipulating the position of a spindle assembly 132 on a carriage 130, actuators 176 adjusting the speed of a motor 140, and actuators 178 selectively deploying and retracting flange retainers 144. An actuator suite 154 may also include actuators 180 controlling the position of a tube stop to adjust for the presence or absence of a flange 12 on the end of the tube 14 not currently being welded and actuators 182 selectively opening or closing various safety shrouds 146. An actuator suite 154 may also include other actuators 184 as needed or desired.

The present invention may be embodied in other specific forms without departing from its functions, operational principles, processes, structures, or essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

What is claimed and desired to be secured by United States Letters Patent is:

1. A method for assembling a reel, the method comprising:
   selecting a tube formed of a first thermoplastic in an extrusion process, the tube characterized by a first melt index and having a first end and a second end;
   selecting a first flange formed of a second thermoplastic characterized by a second melt index and having a containment region sized to receive the first end of the tube;
   maintaining continuous, relative, rotary motion of the tube and flange with respect to one another;
   imposing axial relative motion of the tube and flange with respect to one another simultaneously with the continuous, relative, rotary motion;
   capturing a liquified portion of the first thermoplastic proximate the first end of the tube;
   heating further the liquified portion by substantially continuous, relative, rotary motion;
   containing the liquified portion substantially surrounding a first portion of the wall penetrating the flange, the liquified portion of the first thermoplastic being maintained within a solid portion of the containment region maintaining pressure in the liquified portion contained therein;
   heating, by the liquified portion of the flange in contact therewith, a melting portion of the first end of the tube into a fluid state;
   mixing the liquified portion of the flange with the melting portion of the tube;
   ceasing the relative rotary motion and axial motion;
   welding the tube and flange by solidifying the mixture of the liquified portion and the melting portion in a chemical bond.

2. The method of claim 1, wherein the first and second thermoplastics are both selected from the same family and the family is selected from the group consisting of polyethylene, polystyrene, and ABS.

3. The method of claim 1, wherein the first thermoplastic comprises an olefin haying a melt flow index in the range of from about 0.1 to about 1.

4. The method of claim 3, wherein the second thermoplastic comprises an olefin haying a melt flow index in the range of from about 4 to about 30.

5. The method of claim 4, further comprising selecting a second flange formed of the second thermoplastic in an injection molding process and haying a containment region sized to receive the second end of the tube.

6. The method of claim 5, wherein the containment region of the first flange and the second flange is a cylindrical slot, and further comprising inserting the second end of the tube within the cylindrical slot of the second flange.

7. The method of claim 6, further comprising welding the tube to the second flange by inducing relative rotation between the second flange and the tube.

8. The method of claim 7, wherein:
the tube has a wall thickness; and
the cylindrical slot of the first flange has a depth greater than twice the wall thickness of the tube.

9. The method of claim 8, wherein the cylindrical slot of the first flange provides an interference fit with the first end of the tube.

10. The method of claim 9, wherein the interference fit provides increasing interference with increasing depth.

11. The method of claim 10, wherein welding the tube to the first flange comprises inducing relative rotation between the first flange and the tube at a rate in the range of about 1500 RPM to about 2000 RPM.

12. The method of claim 11, wherein welding the tube to the first flange and welding the tube to the second flange occur substantially simultaneously.

13. The method of claim 12, wherein inserting the first end of the tube within the cylindrical slot of the first flange and welding the tube to the first flange by spinning occur in overlapping periods time.

14. The method of claim 13, wherein welding the tube to the first flange by inducing relative rotation continues for a period in the range of from about 0.3 to about 0.5 seconds after the first end of the tube has been inserted to the full depth of the cylindrical slot.

15. The method of claim 1, wherein:
the tube has a wall thickness; and
the containment region of the first flange comprises a cylindrical slot having a depth greater than twice the wall thickness of the tube.

16. The method of claim 1, wherein welding the tube to the first flange comprises inducing relative rotation between the first flange and the tube at a rate in the range of about 1500 RPM to about 2000 RPM.

17. The method of claim 1, wherein:
inserting the first end of the tube within the containment region of the first flange and welding the tube to the first flange by spinning occur in overlapping periods time; and
welding the tube to the first flange by inducing relative rotation continues for a period in the range of from about 0.3 to about 0.5 seconds after the first end of the tube has been inserted to the full depth of the containment region.

18. The method of claim 1, further comprising selecting the relative rotation at a rate in the range of about 1500 RPM to about 2000 RPM.

19. The method of claim 18, further comprising dwelling, while rotating at the second rate, for a period of time ranging from about 0.3 seconds to about 0.5 seconds.

20. A method for assembling a reel, the method comprising:
selecting a tube, radially symmetric, having first and second ends, and formed of a first thermoplastic characterized by a first grade having a first melt index;
selecting a first flange formed of a second thermoplastic characterized by a second grade, distinct from the first grade and having a second melt index higher than the first melt index;
providing in the first flange a containment region characterized by an opening formed by a wall sized and shaped to receive the tube in combined axial and circumferential motion thereagainst;
maintaining continuous, relative, rotary motion of the tube and flange with respect to one another;
imposing axial relative motion of the tube and flange with respect to one another simultaneously with the continuous, relative, rotary motion;
capturing a liquified portion of the wall proximate the first end of the tube;
heating further the liquified portion by the relative rotary motion;
containing the liquified portion substantially surrounding a first portion of the wall penetrating the opening;
heating, by the liquified portion of the flange in contact therewith, a melting portion of the first end into a fluid state;
mixing the liquified portion of the flange with the melting portion of the tube;
ceasing the relative rotary motion and axial motion;
solidifying the mixture of the liquified portion and the melting portion in a chemical bond.

21. The method of claim 20, further comprising:
selecting the tube of a first polymeric resin having a melt flow index in the range of from about 0.1 to about 2;
selecting a flange of a second polymeric resin having a melt flow index in the range of from about 1 to about 30;
sizing a thickness of the containment region to maintain an exterior structural integrity containing the liquified portion, during heating thereof by the relative rotation, for a time selected to melt the melting portion of the tube.

22. A method for assembling a reel, the method comprising:
selecting a tube, radially symmetric, having first and second ends, and formed of a first thermoplastic characterized by a first grade having a first melt index;
selecting a first flange formed of a second thermoplastic characterized by a second grade, distinct from the first grade and having a second melt index higher than the first melt index;
providing in the first flange a containment region characterized by an opening formed by a wall sized and shaped to receive the tube in combined axial and circumferential motion thereagainst;
maintaining continuous, relative, rotary motion of the tube and flange with respect to one another;
heating the first end and the wall simultaneously and exclusively by imposing monotonically advancing axial relative motion of the tube and flange with respect to one another simultaneously with the continuous, relative, rotary motion.

23. The method of claim 22, further comprising:
capturing a liquified portion of the wall proximate the first end of the tube;
heating further the liquified portion by the relative rotary motion; and
containing the liquified portion substantially surrounding a first portion of the wall penetrating the opening.

24. The method of claim 23, further comprising:
heating, by the liquified portion of the flange in contact therewith, a melting portion of the first end into a fluid state; and
mixing the liquified portion of the flange with the melting portion of the tube.

25. The method of claim 24, further comprising:
ceasing the relative rotary motion and axial motion; and
solidifying the mixture of the liquified portion and the melting portion in a chemical bond.

* * * * *